United States Patent [19]

Gerst, Jr. et al.

[11] 4,331,960
[45] May 25, 1982

[54] AUTOMATIC TRACKING METHODS AND APPARATUS

[75] Inventors: Carl W. Gerst, Jr., Skaneateles; Hugh A. Hair, Fayetteville, both of N.Y.

[73] Assignee: Anaren Microwave, Incorporated, Syracuse, N.Y.

[21] Appl. No.: 126,548

[22] Filed: Mar. 3, 1980

[51] Int. Cl.³ .............................................. G01S 5/02
[52] U.S. Cl. .......................... 343/117 R; 343/113 R
[58] Field of Search ......... 343/100 SA, 854, 100 AD, 343/117 R, 16 M, 113 R

[56] References Cited

U.S. PATENT DOCUMENTS

| | | | |
|---|---|---|---|
| 3,025,520 | 3/1962 | Werner et al. | 343/6.5 R |
| 3,148,369 | 9/1964 | Zable et al. | 343/117 R |
| 3,540,054 | 11/1970 | Broderick | 343/113 R |
| 4,160,975 | 7/1979 | Steudel | 343/100 SA |

Primary Examiner—Theodore M. Blum
Attorney, Agent, or Firm—Hane, Roberts, Spiecens & Cohen

[57] ABSTRACT

A tracking antenna system includes coarse (CEA), medium (MEA) and fine (FEA) antenna arrays symmetrically disposed with respect to a boresight (BST) and controllably connectable to signal processing units (SPU) such that the antenna platform (PTF) is moved to point the boresight in the direction of a target while progressively increasing the resolution of the angular difference between the boresight and target. There are provisions for backtracking to decrease the resolution if the angular difference goes out of selected ranges.

10 Claims, 7 Drawing Figures

TRACK ANTENNA SYSTEM  TAS

AZIMUTH ANTENNA ARRAYS  ARA

AZIMUTH CONTROL UNIT ACU

DIGITAL PHASE DISCRIMINATOR DPD

AUTOMATIC TRACKING METHODS AND APPARATUS

TECHNICAL FIELD

This invention pertains to the location of radiating targets and more particularly to the automatic tracking of a remote target which is self-radiating or is reflecting remotely generated microwave radiation.

BACKGROUND ART

It is quite often necessary to know the location of a remote body. In many instances a remote body such as a missile or a craft poses a threat to a receiver. Therefore it is necessary to known the position of the body so as to be able to defend against such threat. Furthermore, it is also necessary to known the position of a remote body to which one wishes to transmit microwave energy either as power or as carrier signals. Generally the location is performed by an antenna array having a boresight. The position of the target is measured as the difference between the direction of the boresight and the bearing of the target with respect to the antenna array. As the distance between the target and antenna array increases the measurement of such angular difference becomes more and more difficult. Heretofore very complicated arrays have been used to permit a very long viewing angle, say, in the order of 20° with still reasonable resolution. Although antenna arrays have grown to considerable dimensions the resolution therefrom is still rather restricted. It is therefore an object of the invention to provide an improved method and apparatus for tracking a remote target.

DISCLOSURE OF INVENTION

In general the invention contemplates aiming the boresight of an antenna array at a remote target by stepwise measuring the angular difference between the target bearing and the boresight. In particular, if the bearing of the target comes within a first particular angular range with respect to the boresight of the antenna. The angular difference between the boresight and the bearing are measured to a first resolution. In accordance with this measuring the antenna boresight is slewed toward the bearing of the target to minimize the angular difference. When the angular difference enters within a second and smaller angular range the measuring is continued to a second and final degree of resolution. During this further measuring the antenna boresight is slewed closer to the bearing of the target.

In this way it is possible during the first portion of the tracking to encompass a fairly large viewing angle to a coarse degree of resolution. Once the target comes within a certain second range the measuring is continued with a fine degree of resolution. Hence it is possible to minimize the overall configuration of the antenna array.

The objects, features and advantages of the present invention will be apparent from the following detailed description when read with the accompanying drawing which shows presently preferred realization of the invention.

BEST MODE FOR CARRYING OUT THE INVENTION

Figure 1:
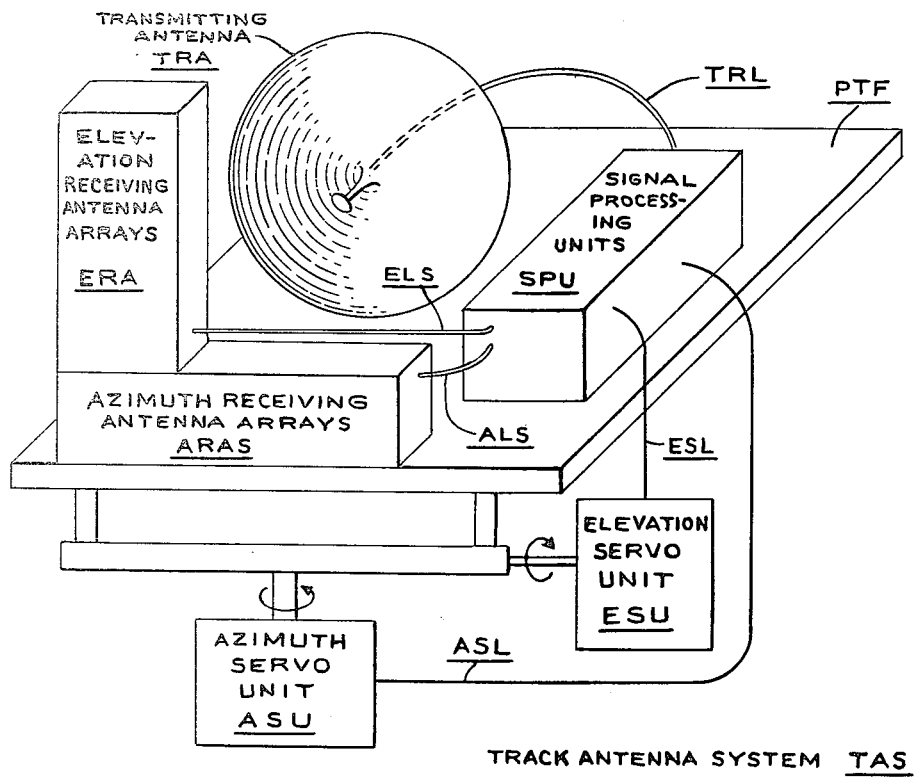
FIG. 1 shows a perspective partially in schematic of a tracking antenna system for performing the invention.
Figure 2A:
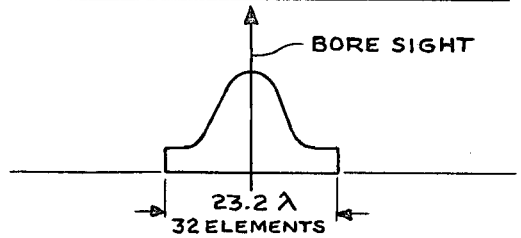
FIG. 2a is waveform diagram for a Taylor weighted array.
Figure 2:
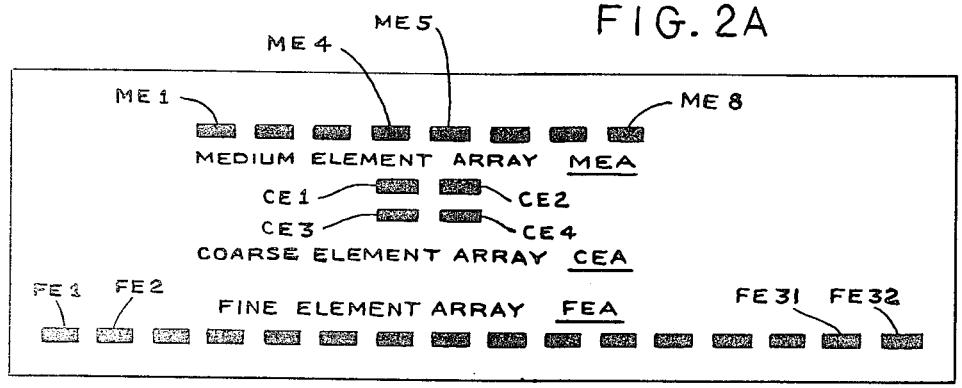
FIG. 2 shows the azimuth receiving antenna array of FIG. 1 (the elevation antenna arrays are the same)

The tracking antenna system TAS is shown in FIGS. 1 and 2. The system includes a platform PTF which can be moved in the azimuth plane under the control of the azimuth servo unit ASU. It can also be moved to rotate in the elevation plane under the control of the elevation servo unit ESU. The platform which is stabilized carries the elevation receiving antenna arrays ERA and orthogonal thereto the azimuth receiving antenna arrays ARA. These arrays are aligned along the antenna boresight. In addition the platform supports the transmitting antenna TRA whose axis can be considered along the same boresight. The antenna arrays ERA and ARA transmit phases signals relative to the angle between the boresight and the bearing of a target. These signals are fed via lines ELS and ALS to the signal processing units SPU which may or may not be on the platform. The signal processing units SPU generate signals which are fed via lines ESL and ASL to the elevation servo unit ESU and the azimuth servo unit ASU respectively. In addition, the signal processing units SPU transmit via the cable TRL microwave energy to the transmitting antenna TRA for transmission to the target.

In FIG. 2 there is shown the details of the azimuth antenna arrays ARA. These arrays comprise: the coarse element CAA having the four radiator elements CE1 to CE4; the medium element array MEA having the eight radiator elements ME1 to ME4; and the fine element array FEA having the radiator elements FE1 to FE32. It should be noted that the arrays and particularly the medium and fine arrays have their radiator elements disposed in a straight line symmetrical about the boresight of the system.

Each of the radiator elements is preferably a slot-line planar antenna which can be printed as a strip-line circuit.

As will hereinafter become apparent each of the arrays is divided into, say, a left sub-array and a right sub-array. For example, in FIG. 2 for the azimuth antenna arrays the medium element arrays MEA would be divided into a left sub-array including the elements ME1 to ME4 and a right sub-array including the elements ME5 to ME8. Each of the sub-arrays is connected to a power as will hereinafter become apparent. In the following discussion it will be assumed that the arrays are transmitting instead of receiving. The analysis will not be any different because of the reciprocal nature of the arrays.

It has been found especially desirable to configure the arrays so that the side lobes are suppressed to the point that whatever the value of the angular difference a definite indication is given that it is either inside or outside a given range. This is accompanied by many array configurations.

A detailed presentation of such suppression is given in section 2.13 entitled "Methods of Shaping Patterns" of ANTENNA ENGINEERING HANDBOOK, first edition, Henry Jasik, Editor published by McGraw-Hill Book Company, New York, in 1961. An especially useful configuration is called a Taylor-weighted array. A description of such an array can be found in "Design of Line-source Antennas for Narrow Bandwidth and Low Sidelobes." by T. T. Taylor in IRE Transactions, vol. AP-3, pp. 16–28, January, 1955. The power distribution of the typical fine element array FEA is shown in FIG. 2a. As is known this distribution can be obtained either by controlling the power fed to each of the elements or by non-uniformly spacing the elements along their array line. However, the most desirable way of obtaining the distribution is to have a combination amplitude and space weighting as a compromise. With such a compromise, it is has been found that the space-taper need not be too severe and can have a maximum to minimum spacing ratio of 1.3. In addition the "power-taper" can have a ratio from minimum to maximum of 3.

In operation the system simultaneously track a target in the elevation plane and in the azimuth plane. These two trackings are orthogonal and operate over separate channels to control their respective servo units. For example, the azimuth receiving antenna arrays ARA track in the azimuth plane and generate signals which are processed in its own azimuth signal processing unit in the processing units SPU to generate signals fed via line ASL to the azimuth servo unit ASU. Simultaneously, the similar operation is being performed by the elevation "channel".

Since the operations are the same and since the apparatus for performing the functions is the same, only the azimuth portion of the system will be described in detail. It being understood that the elevation portion of the unit operates in a similar manner and has the same type of components. It will be also assumed by way of example and not limitation that the system operates at a 16 GHz range. The coarse element array CEA is assumed to cover a 40° range. The medium element array MEA has a coverage of say 10° and the fine element array has a coverage of say 2.5°.

In operation when the target comes within the 40° range it is sensed by the coarse array CEA which starts feeding this information back to the signal processing units. The signal processing units SPU in response thereto emit signals via line ASL to the azimuth servo unit ASU which starts closing the difference in the angle between bearing and the boresight. When this angle closes down to within 10° the medium element array MEA takes over and its signals are processed by the signal processing units which now generate the signals for the servo. When the angle difference closes down to within 2.5° the signal processing units SPU accept the signals from the fine element array FEA to now close the angle down to a fraction of a degree.

When the angle is within a particular range, the signal processing units SPU transmit microwave energy via the cable PRL to the transmitting antenna TRA which feeds this energy towards the target. During this time the receiver portion is turned off. It is possible that during the shutoff the target may move off the boresight. The fine and medium element arrays are designed so that when the signal is off the main beam the signal processing units SPU sense this fact and "upshift" to the next less sensitive array to reacquire the target. Once the target is reacquired then the "downshifting" to finer sensitivity starts again.

Figure 3:
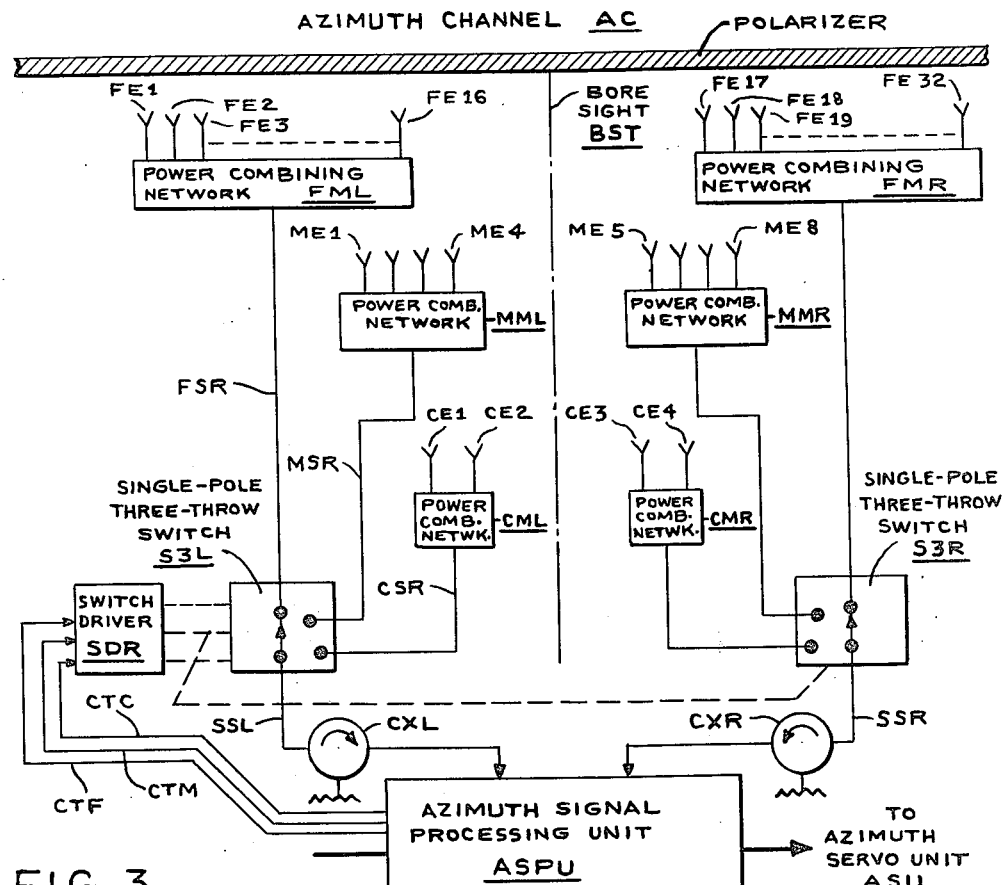
FIG. 3 shows in schematic of the antenna arrays in combination with a processing unit.

The details of the azimuth channel AC are shown in FIG. 3. The azimuth receiving antenna arrays ARA are shown as three pairs of sub-arrays symmetrically disposed about the boresight BST. Thus, each array is a linear array in the monopulse configuration. For example, the left element fine array includes the radiator elements FE1 to FE16 configured on one side of the boresight which are spaced and power-weighted to have the amplitude response shown on the left half of FIG. 2a. The radiator elements FE17 to FE32 configured on the right hand side of the boresight are spaced and power weighted to have the amplitude response shown on the right half of FIG. 2a. Each set of the radiator elements is connected to its own power combining network. For example, the fine radiator elements FE1 to FE16 are connected to the power combining network FMR. Such networks are well known in the art. In the present example the received power from the radiator elements is collected by the respective input ports of the network for power combining. The "sum" signal is fed via line MSR to an input port of switch S3L similarly the signals from the medium and coarse arrays are fed via the cables MSR and CSR, respectively, to other input ports of the switch S3L.

The switch S3L can be a "single pole, three-throw" switch which in response to signals from the switch driver SDR connects the common output port thereof to the selected one of the input ports. Such switches are well known in the microwave art and use PIN.-diode gating techniques. The switch driver SDR is an array of amplifiers which convert logic signals on lines CTS, CTM and CTC from the signal processing units ASPU to the gating levels required for the PIN diodes. The common output port of the switch S3L is connected via a conventional circulator CXL to one input of the azimuth signal processing unit ASPU. The azimuth signal processing unit ASPU in response processes these signals as well as signals from the "right" channel and generates the logic control signals for the switch driver SDR to control the switch S3L and switch S3R. In addition, the unit ASPU generates a digital number which is fed to the azimuth servo unit ASU to control the azimuth rotation of the platform.

Figure 4:
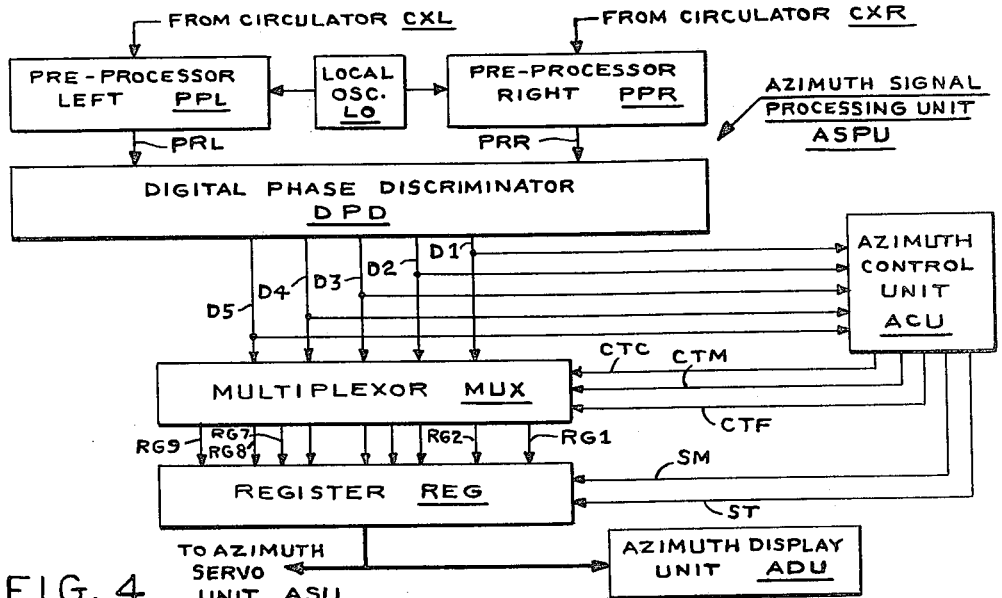
FIG. 4 is a block diagram of the azimuth signal processing channel of the system of FIG. 1.

The azimuth signal processing unit ASPU shown in FIG. 4 basically processes the signals received from the circulator CXL and the circulator CXR to generate a digital value representing the azimuth angle difference between the bearing of the target and the boresight of the system. These signals are fed to their respective pre-processors PPL and PPR respectively, for frequency downconverting, filtering and limiting. This pre-processing is well known in the art and requires no further discussion. The processed signals are fed via the respective lines PRL and PRR to the digital phase discriminator DPD which in response thereto generates a five-bit digital value emitted on the lines D1 to D5. This number is fed to the multiplexer MUX and to the control unit CU. The multiplexer MUX is basically the equivalent of five switches each having an input terminal and three output terminals. The following set of Boolean equations define the operation of the switch.

| | | |
|---|---|---|
| RG9 = D5 | CTC | |
| RG8 = D4 | CTC | |
| RG7 = D3 | CTC + D5 | CTM |

-continued

| | | |
|---|---|---|
| RG6 = D2 | CTC + D4 | CTM |
| RG5 = D1 | CTC + D3 | CTM + D5    CTF |
| RG4 = D2 | CTM + D4 | CTF |
| RG3 = D1 | CTM + D3 | CTF |
| RG2 = D2 | CTF | |
| RG1 = D1 | CTF | |

The outputs of the multiplexer MUX are fed via the lines RG1 to RG9 to the respective stages of a nine-stage storage register REG. During the coarse mode of the operation, the control unit CU emits a control signal on line CTC causing the five-bits from the discriminator DPD to be fed into the five more significant stages of the register. During the medium mode of the tracking the control unit emits a signal on line CTM which causes the loading of the third to seventh stages of the register and during the fine mode the control unit emits a signal on line CTF which causes the loading of the first to fifth stages of the register. Since the register is composed of latches which are periodically sampled by a signal SM from the control unit it is seen that the five bit binary values generated by the digital phase discriminator DPD are built up to a nine-bit binary value. This five-bit binary value is fed to the azimuth display unit ADU for further processing as well as to the azimuth servo unit ASU where it is converted to control signals for rotating the platform in the azimuth plane. (It should be noted that at the start of each tracking operation a signal ST is received by the register for initial clearing.)

Figure 5:
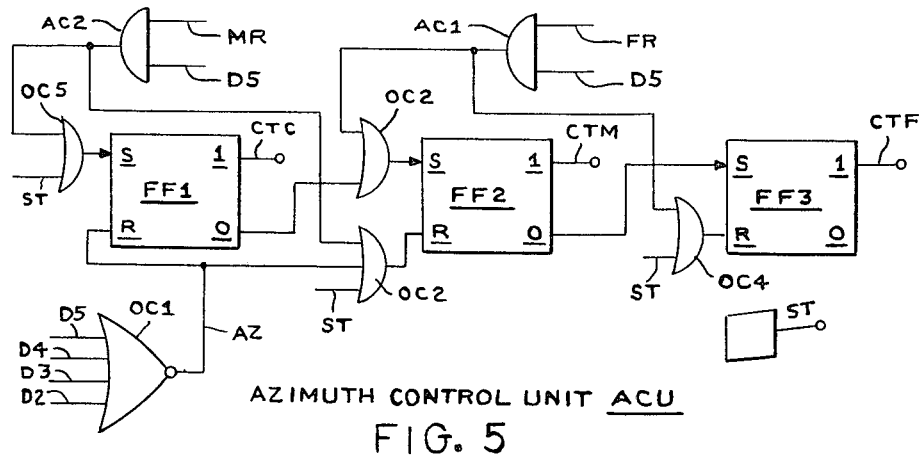
FIG. 5 shows a logic diagram of the processing unit of FIG. 4.

In FIG. 5 there is shown the azimuth control unit ACU centered around the three flip-flops FF1, FF2 and FF3 which determine the coarse, medium and fine modes, respectively. At the start of the operation a signal is generated and fed on line FT. This signal sets the flip-flop FF1 and clears the flip-flops FF2 and FF3 putting the system in the coarse mode. When the tracking is such that the angle difference goes down into the medium range as indicated by the absence of signals on lines D2, D3, D4 and D5 a signal is generated by the OR-circuit OC1 and fed via line AZ to the clear input of the flip-flop FF1. This signal clears the flip-flop and the signal from its zero-output is fed via the OR-circuit OC2 to set the flip-flop FF2 which generates the signal at the line CTM indicating the medium mode. This mode persists until again the angle difference goes within a third range as indicated by the signals on the lines D2 to D5 at the input of OR-circuit OC1. This time the signal on line AZ passes through the OR-circuit OC2 to reset the flip-flop FF2. In response thereto the zero-output of the flip-flop FF2 is fed to the set input of the flip-flop FF3. This flip-flop sets and starts generating the signal on CTF indicating the fine mode of tracking. If during the fine mode the angle difference goes outside the range as indicated by a signal on line D5 the AND-circuit AC1 passes a signal to both the OR-circuits OC2 and OC4. The signal at the OR-circuit OC4 clears the flip-flop FF3 terminating the fine mode while the signal at the OR-circuit OC2 sets the flip-flop FF2 to reinstitute the medium mode. Similarly, when the system is in the medium mode if the bearing angle again goes outside the range for the medium mode as indicated by a signal on line D5, the AND-circuit AC2 passes a pulse to the OR-circuit OC2 clearing the flip-flop FF2 and terminating the medium mode while the signal at the OR-circuit OC5 sets the flip-flop FF1 reinstituting the coarse mode. In a sense the signal on line D5 indicates whether the angle is within or without the range.

Figure 6:
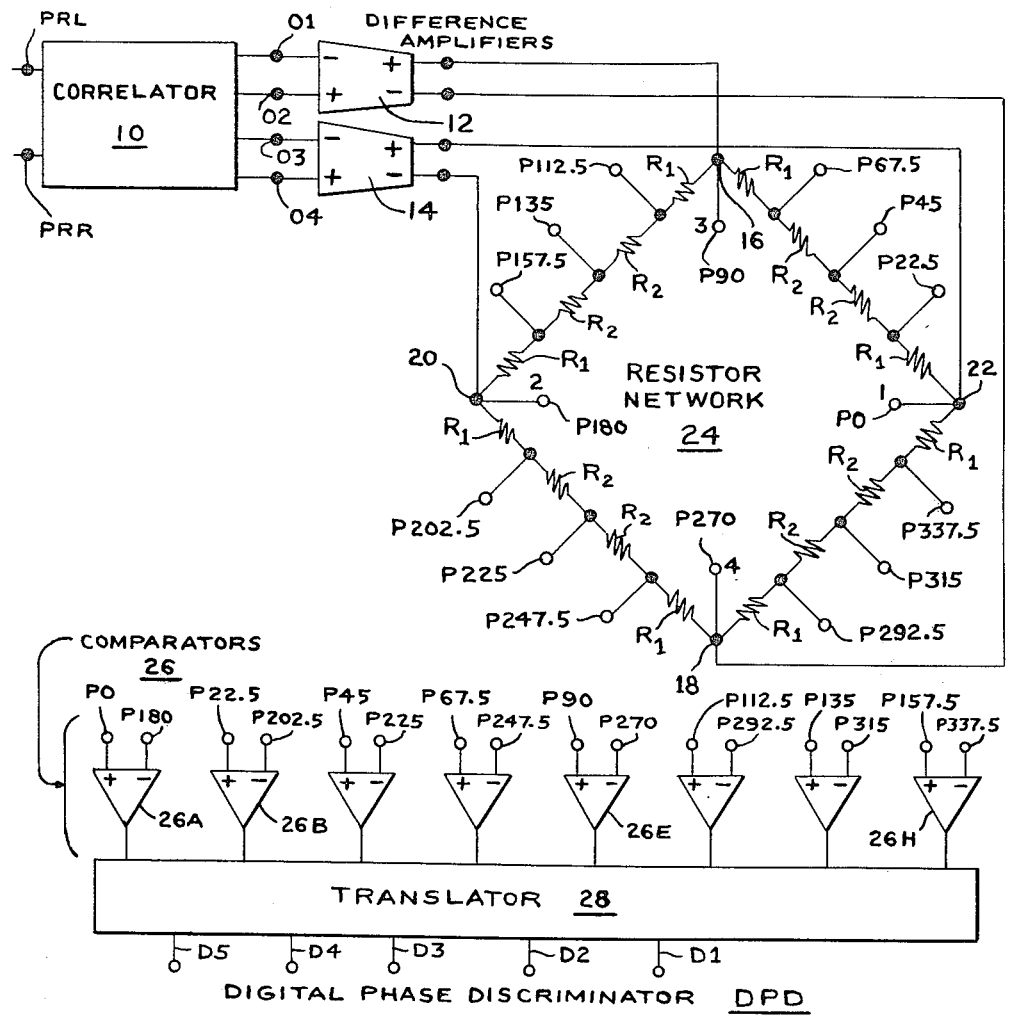
FIG. 6 shows a schematic diagram of the phase discriminator of the processing unit of FIG. 4.

In FIG. 6, showing the digital phase discriminator DPD, the correlator 10 receives two signals whose phase difference is to be measured. A typical correlator can be that shown in U.S. Pat. No. 3,517,309 up to the outputs of the low pass filters LP1 to LP4 which are then connected to the terminals O1 to O4 of the FIG. 6.

The terminals O1 and O2 are connected to the negative and positive input terminals of balanced difference amplifier 12 which emits across its positive and negative output terminals a signal proportional to sin $\theta$, where is the phase difference between the two signals whose phase difference is being measured. Similarly the terminals O3 and O4 are connected to the negative and positive input terminals of balanced difference amplifier 14 which emits across its positive and negative output terminals a signal proportional to cos $\theta$, where is the phase difference between the two signals whose phase difference is being measured.

The output terminals of the difference amplifiers 12 and 14 are connected to input terminals or resistor network 24. The resistor network has four input terminals 16, 18, 20 and 22. The pair of input terminals 16 and 18 are connected to the output terminals of amplifier 12 so that a signal proportional to sin $\theta$ is developed across terminals 16 and 18. The pair of input terminals 22 and 22 are connected to the output terminals of amplifier 14 so that a signal proportional to cos $\theta$ is developed across terminals 20 and 22. Between input terminal 16 and input terminal 20 there is a set of weighted resistors $R_1$, $R_2$, $R_2$ and $R_1$. Between input terminals 20 and 18 there is an equivalent set of the resistors. Similarly between input terminals 18 and 11 and input terminals 22 and 16. The number of resistors in each set must be the same. The number is chosen based on the desired resolution. The resolution is determined by the following formula Resolution = $r$ = 360°/$n$ where n is the number of resistor in a set. In FIG. 6, by way of example, there are four resistors per set. Hence, the resolution is 22.5°.

The values of the resistors are chosen according to the following formula $$R_N = \frac{1}{1 - \tan[-90° + N]} - \frac{1}{1 - \tan[-90° + (N+1)]};$$

where r is definite above; and N = the numerical position of the resistor with respect to the output terminals. Thus, $R_1 = 0.293$ R; and $R_2 = 0.207$ R; where R is the total resistance between a pair of output terminals.

Although the resistor layout in FIG. 6 is shown as a square it can be called a ring as long as it has the following properties. The input terminals of each pair must be separated by 2$n$ resistors. Thus, in FIG. 6 the pair of terminals 16 and 18 are separated by eight resistors and the pair of input terminals 20 and 22 are separated by eight resistors. The connection between any two input terminals one from each pair is only by one set of serially connected resistors.

Connected to the junction of each adjacent pair of resistors R is an output terminal PN. In FIG. 6 the output terminals have been given reference numerals equivalent to angular relationships assuming the output terminal PO connected to terminal 22 is considered zero phase and the sine and cosine inputs are as stated above. There is a defined relationship between pairs of output terminals. A pair of output terminals is considered in antiphase when and only when 2n resistors separate the two terminals around the loop. For tutorial reasons the output terminals have been reference numerals equivalent to the direction of a radius vector for heretofore used CRT display devices.

The pairs of output terminals in antiphase relationship are connected to the inputs of 2n two-input logic means in the form of signal magnitude comparators 26. Since for the present example there are four resistors per set there are eight comparators 26A to 26H. These comparators can take many forms but for the preferred embodiment it is assumed that the signals at the outputs of the amplifiers 12 and 14 swing about a positive quiescent level of such amplitude that the signals at the output terminals PN never go negative. Therefore, the comparators are such that whenever the signal at a (+) input is greater than the signal at a (−) input the comparator output is high or "1". Otherwise, the comparator output is low or "0".

TABLE I

| Angle | Digital Code | Angle | Digital Code |
|---|---|---|---|
| 000.0 | 1 1 1 1 0 0 0 0 | 180.0 | 0 0 0 0 1 1 1 1 |
| 022.5 | 1 1 1 1 1 0 0 0 | 202.5 | 0 0 0 0 0 1 1 1 |
| 045.0 | 1 1 1 1 1 1 0 0 | 225.0 | 0 0 0 0 0 0 1 1 |
| 0.67.5 | 1 1 1 1 1 1 1 0 | 247.5 | 0 0 0 0 0 0 0 1 |
| 0.90.0 | 1 1 1 1 1 1 1 1 | 270.0 | 0 0 0 0 0 0 0 0 |
| 112.5 | 0 1 1 1 1 1 1 1 | 292.5 | 1 0 0 0 0 0 0 0 |
| 135.0 | 0 0 1 1 1 1 1 1 | 315.0 | 1 1 0 0 0 0 0 0 |
| 157.5 | 0 0 0 1 1 1 1 1 | 337.5 | 1 1 1 0 0 0 0 0 |

In Table I there is shown the outputs of the comparators 26A to 26H for the sixteen angle quanta possible with the resolution obtained for 4n resistors. While this digital code is useful and unique to the angles, it is the usual case to translate this code into a straight binary or binary-coded decimal code. Such translation is performed by translator 28 which can be a read only memory acting as a function table. For example, it would translate the digital code 1111000 to 0000 in binary code and the digital code 11100000 to 1111 in binary code. Such techniques are well known in the art and will not be discussed.

The apparatus operates as follows: correlator 10 receives the two signals whose phase difference is to be measured and transmits signals to balanced difference amplifier 12 and 14. Across terminals 16 and 18 there is developed a signal proportional to sin while across terminals 20 and 22 there is developed a signal proportional to $\cos\theta$. Hence at each output terminal PN there is a signal functionally related to the vector sum of $\sin\theta$ and $\cos\theta$. For example, assume that the phase difference is 0°, then there is no signal across terminals 16 and 18 (sin 0°=0) and maximum signal between terminals 20 and 22 (cos 0°=1) with terminal 22 positive with respect to terminal 20. Thus, the signals at output terminals P0, P22.5, P45, P67.5, P337.5, P315, and P292.5 are greater than at terminals P180, P202.5, P225, P247.5, P112.5, P135 and P157.5. Thus, the digital code will be 1111X000. There is an ambiguity at comparator 26E since both inputs are zero. However, because of hysteresis and bias it could be forced to emit a low signal for this case.

The servo units shown in FIG. 1 are conventional digital servomechanisms which are well known and will not be described.

In a working system, it would be necessary to calibrate the system for phase differences systematically introduced between the left and right channels of each signal processing unit. Thus, for example in FIG. 3, each of the switches S3L and S3R would have another position which receives the same signal. Before a tracking operation the switches would transmit this signal to the processing unit ASPU and a phase difference would be measured. This phase difference would be a correction value which would then be used to modify any angles measured during the actual tracking operation.

While only one embodiment of the invention has been shown and described in detail there will now be obvious to those skilled in the art many modifications and variations satisfying many or all of the objects of the invention without departing from the spirit thereof as defined by the appended claims. For example, while the digital phase discriminator generated 5-bit numbers and the registered stored 9-bit numbers these numbers are representative and generally larger numbers would give greater resolution. While then only angle measurement technique that has been shown using signal summing techniques for weighted arrays since this is preferable, one could also use conventional "monopulse" techniques wherein the summed signals a and b from the left and right sub-arrays, respectively, are fed to a 180° hybrid to produce a sum signal $\Sigma_0=a+b$ and a difference signal $\Delta_0=a-b$. Then the phase difference $\theta$ is related to $\Sigma_0$ and $\Delta_0$ as $$|\theta| = 2\tan^{-2}\left|\frac{\Delta_0}{\Sigma_0}\right|$$

and range switching would be controlled by $|\theta|$. One knows that when $|\theta|$ is greater than 90° the angle is outside the range being used and a shift to a coarse array must occur.

What is claimed is:

1. A tracking receiver system for indicating the bearing of a target comprising: a first antenna element array, said array having first and second sub-arrays symmetrically disposed about a boresight; a first power combining network means for coupling the elements of the first sub-array of said first array to a first output port; a second power combining network means for coupling the elements of the second sub-array of said first array to a second output port; phase discriminator means having first and second input ports respectively connected to said first and second output ports and an output means for giving a representation of the angular difference of the signals present at its input ports; and means connected to said output means for transmitting a first type signal when the angular difference is greater than a predetermined value and for transmitting a second type signal when the angular difference is less than said predetermined value.

2. A tracking receiver system for indicating the bearing of a target comprising: first antenna and second antenna element arrays, each of said arrays having first and second sub-arrays symmetrically disposed about a boresight, said second array having more antenna elements than said first array to provide greater resolution than said first array of the angular difference between the bearing of the target and the boresight; a first power combining network means for coupling the elements of the first sub-array of said first array to a first output port; a second power combining network means for coupling the elements of the second sub-array of said first array to a second output port; a third power combining network means for coupling the elements of the first sub-array of said second array to a third output port; a fourth power combining network means for coupling the elements of the second sub-array of said second array to a fourth output port; controlled switch means having first, second, third and fourth input ports respectively connected to said first, second, third and fourth output ports, said first and second common output ports, said controlled switch means, in response to a first type signal, connecting its first input port to said first common output port and its third input port to said second common output port and in response to a second type signal connecting its second input port to said first common output port and its fourth input port to said second common output port; phase discriminator means having first and second input ports respectively connected to said first and second common output ports and an output means for giving a representation of the angular difference of the signals present at its input ports; and control means connected to said output means for transmitting a first type signal to said switch means when the angular difference is greater than a predetermined value and for transmitting a second type signal to said switch means when the angular difference is less than said predetermined value.

3. The system of claim 1 or 2 wherein said antenna element arrays are on a movable platform and further comprising means, responsive to said phase discriminator means, for moving said platform to direct the boresight toward the bearing of the target.

4. The system of claim 3 further comprising a transmitting antenna and means for controlling said transmitting antenna to radiate energy in the direction of the boresight.

5. The system of claim 3 wherein said movement is in the azimuth plane.

6. The system of claim 3 wherein said movement is in the elevation plane.

7. The system of claim 2 wherein said representation is a p-bit binary number.

8. The system of claim 7 wherein the output means of said phase discriminator means comprises p-output terminals and further comprising: a q-bit storage register having q-input terminals wherein q is greater than p; and further switching means having p input terminals connected to the p-output terminals of said phase discriminator means and q output terminals connected to the q input terminals of said q-bit storage register, said further switching means including means response to the first type signal from said control means for connecting the p input terminals thereof to a first set consisting of the p more specific output terminals thereof and responsive to the second type signal from said control means for connecting the p input terminals to a second set comprising p of the output terminals thereof including at least the least significant bit terminal of the first set.

9. The apparatus of claim 1 wherein each of said power combining network means and its associated antenna element array comprise a Taylor weighted array 10. The system of claim 8 wherein said antenna element arrays are on a movable platform, and further comprising servo means responsive to said q-bit storage register for moving said platform to direct the boresight toward the bearing of the target.

* * * * *